United States Patent Office 2,739,959
Patented Mar. 27, 1956

2,739,959

POLYMERIZATION OF PYROLIDONE AND PIPERIDONE

William O. Ney, Jr., Providence, and Milton Crowther, Valley Falls, R. I., assignors to Arnold, Hoffman & Co., Incorporated, Providence, R. I., a corporation of Rhode Island No Drawing. Application February 24, 1953, Serial No. 338,554

6 Claims. (Cl. 260—78)

The present invention relates to the polymerization of five and six membered lactams, such as pyrrolidone.

It is the object of this invention to provide a method whereby lactams may be polymerized in high yields; the resulting mixture of lactam and polyamide being in such form that the polyamide may be readily isolated. It is the further object of this invention to provide a method for producing polyamides in various particle sizes.

In the copending application of Barnes, Nummy and Ney, Serial No. 260,558, filed December 7, 1951, now U. S. Patent 2,638,463 of May 12, 1953, there are described procedures for polymerizing pyrrolidone and other five or six membered lactams using alkaline polymerization catalysts, such as potassium hydroxide, potassium pyrrolidone and the like. The principal object of the present invention is to provide novel improvements in the polymerization procedures described in the above mentioned 2,638,463, the disclosure of which patent is hereby incorporated in and made a part of the present application.

Another object of the invention is the provision of procedures for polymerizing pyrrolidone and related lactams whereby the rate of the polymerization and yields and quality of the desired polymer can be improved.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The foregoing objects are accomplished, according to the present invention, by virtue of the discovery (1) that acyl compounds, while not themselves suitable as catalysts for polymerizing pyrrolidone and like lactams, serve as activators of the alkaline polymerization catalyst used according to the procedures described in the above mentioned U. S. Patent 2,638,463, thereby increasing the rate of polymerization and yield of polymers and (2) our discovery that with the use of an activator, a lactam is caused to polymerize while dispersed in a dry or anhydrous non-solvent and the polymer is recovered as a powder. Non-solvents include petroleum ether, gasoline, kerosene, pentane, hexane, octane, isooctane, cyclohexane, cyclohexene, octene, pentene, and other saturated and unsaturated hydrocarbons. The degree of subdivision of the resulting polymer may be regulated by varying the ratio of non-solvent to lactam and the speed of agitation of the suspension of lactam in non-solvent. It has also been noticed that these activators permit control of the molecular weight of the polymers, while the non-solvent acts as a dispersing agent for the lactam.

As acyl compounds suitable for use according to the procedures of the invention, there may be mentioned acyl pyrrolidone, such as acetyl pyrrolidone, adipyl dipyrrolidone, stearoyl pyrrolidone, acetyl morpholone, acetyl piperidone; organic peroxides, such as benzoyl peroxide; cyclic and non-cyclic anhydrides, such as maleic anhydride, phthalic anhydride and acetic anhydride; lactones, such as gamma-butyrolactone, beta-propiolactone, and glycollic lactide; alkyl esters of mono- and di-carboxylic acids, such as butyl stearate, ethyl acetate, propyl butyrate, propyl acetate, ethyl oxalate, as well as esters of polyhydric alcohols, e. g. ethylene glycol diacetate. Particularly desirable for use according to the invention are the acyl pyrrolidones although any of the acyl compounds mentioned above will serve to activate the polymerization catalyst. The non-solvents useful are recited above.

The invention herein described is broadly applicable to the polymerization of five and six membered lactams as described in the above mentioned Patent 2,638,463, including pyrrolidone, piperidone, morpholone, gamma-valerolactam, delta-valerolactam. The conditions utilized for polymerizing these materials may correspond with those outlined in the above mentioned patent, except for the addition of the acyl compound as activator.

The concentration of the activator utilized should be between .001% and 25% by weight of the pyrrolidone or other lactam being polymerized. The most effective concentration range lies between 2 and 10% by weight of the lactam although, in certain situations, for example, when an unusual effect is desired with respect to total yield or molecular weight of the polymer, concentrations outside the range stated may be used with advantage.

Per 10 parts of lactam monomer we use from 1 to 100 parts of non-solvent, by weight, preferably 10 parts monomer to 30 parts non-solvent.

The concentrations recited in the preceding paragraph are based on total activator and non-solvent concentrations present in the polymerization mixture. That is to say, these concentrations do not necessarily represent the exact amount of activator added to the lactam to be polymerized since, in many cases, the lactam as commercially obtained, contains small amounts of acyl compounds formed during production of the lactam.

As indicated above, the polymerization conditions used according to the invention, except for the addition of the activator and non-solvent, such as temperature, time, polymerization catalyst and the like, may correspond with those disclosed in U. S. Patent 2,638,463. Thus, operable polymerization temperatures lie between 0 and 200° C., with the preferred range lying between 20° and 50° C. Bulk or mass polymerization may be utilized or, if desired, polymerization may be carried out in solutions using non-reactive solvents such as dioxan and dimethyl formamide. In any event, whether solvents are or are not used, it is essential that the polymerization be carried out in the absence of water or any other material containing readily available protons. Otherwise, the desired polymerization will be inhibited despite the presence of acyl activators.

The invention as described above is further illustrated in the following examples:

Example 1

This example illustrates the polymerization of pyrrolidone without the addition of activators.

In a vessel equipped for vacuum distillation and mechanical stirring, there is placed 200 parts of pyrrolidone, to which is added one part of potassium hydroxide pellets. The water formed is removed by distilling off 20 parts of the mixture at temperatures between 90 and 120° C., and pressures between 0.5 and 10 mm. The reaction mixture remaining in the still pot is cooled and allowed to stand for five days at room temperature in a vessel which is sealed to exclude atmospheric moisture. The polymer is isolated by the addition of 500 parts of distilled water and is filtered off and washed thoroughly to remove water soluble impurities. The yield of polymer is five parts or 2.5% and the polymer itself is of very low molecular weight, as indicated by relative viscosity measurements. The material does not form satisfactory fibres and on molding gives a molded product which is rather brittle. If a similar run, carried out on the same pyrrolidone in the same way, is allowed to stand for two weeks instead of five days, the yield is only very slightly increased to 2.6%, and the resulting polymer is very similar in properties.

*Example 2*

In a vacuum vessel is placed 200 parts of pyrrolidone, identical with that used in Example 1, and one part of KOH pellets. The water formed is removed by distilling off 20 parts of the mixture at temperatures between 90 and 120° C., and pressures between 0.5 and 10 mm. The reaction mixture remaining in the still pot is treated with 20 parts of gamma-butyrolactone, and the resulting mixture is allowed to stand at room temperature for two hours. By this time, the mixture has completely solidified and is treated with 500 parts of water, and the mixture thoroughly agitated to break up the relatively hard solid. The polymer is isolated as a nearly white powder by filtration and washed thoroughly with distilled water. 91 parts of polymer or a yield of 45.5% is obtained.

*Example 3*

In a vessel equipped for vacuum distillation and mechanical stirring are placed 200 parts of pyrrolidone identical with that used in Example 1, above, 20 parts of gamma-butyrolactone and one part potassium hydroxide pellets. 20 parts of this material is removed by distillation at room temperature between 90 and 120° C., at pressures of 0.5 to 10 mm. The reaction mixture remaining in the still pot is cooled and allowed to stand at room temperatures. After standing three hours, the material is quite firm and solid. 500 parts of distilled water is then added and the mixture agitated thoroughly. The polymer obtained after filtration and thorough washing with distilled water amounts to 82 parts or 41 per cent by weight.

*Example 4*

In a vessel equipped for vacuum distillation and mechanical stirring are placed 200 parts of pyrrolidone identical with that used in Example 1 above, and one part KOH pellets. 20 parts of this material is removed by distillation at room temperatures between 90 and 120° C., at pressures of 0.5 to 10 mm. This material is allowed to stand for two weeks at room temperature in a vessel sealed to exclude atmospheric moisture. At the end of which time only a very small amount of polymer is present. To this mixture is added 20 parts of gamma-butyrolactone. Within 15 minutes a noticeable thickening of the solution occurs, and at the end of 1½ hours, the material has solidified to a firm but workable solid mass. Upon treatment with 500 parts of distilled water, filtration and thorough water washing, 73 parts of 36.5 per cent of polymer is obtained.

*Example 5*

In a vacuum vessel is placed 200 parts of pyrrolidone, identical with that used in Example 1, and one part of KOH pellets. The water formed is removed by distilling off 20 parts of the mixture at temperatures between 90 and 120° C., and pressures between 0.5 to 10 mm. The reaction mixture remaining in the still pot is treated with 20 parts of gamma-butyrolactone, and the resulting mixture allowed to stand at room temperature for 24 hours. The polymerization proceeds to such an extent that the resulting solid is extremely hard and cannot be worked up by the addition of water, nor can it be readily shredded or cut. It is a very hard, tough, buff colored solid which has taken the shape of the container in which it stood. The polymerization is essentially complete within twenty-four hours.

*Example 6*

In a vessel equipped for vacuum distillation and mechanical stirring is placed 200 parts of pyrrolidone, identical with that used in Example 1, and one part KOH pellets. The water formed is removed by distilling off twenty parts of the mixture at temperatures between 90 and 120° C., and pressures of between 0.5 and 10 mm. The reaction mixture remaining in the still pot is treated with one part of gamma-butyrolactone and allowed to stand for two weeks. The reaction mixture is set to a firm solid which can be readily disintegrated and to which 500 parts of water is added. The resulting mixture is thoroughly agitated, and the polymer is filtered off and washed with distilled water. Forty-five parts or 22.5 per cent yield of polymer is obtained.

*Example 7*

In a vacuum vessel is placed 200 parts pyrrolidone, identical with that used in Example 1, and one part KOH pellets. The water formed is removed by distilling off twenty parts of the mixture at temperatures between 90 and 120° C., and pressures of between 0.5 and 10 mm. One part of gamma-valerolactone is added and the resulting mixture is allowed to stand for three days at room temperatures. 500 parts of distilled water is added and the insoluble polymer filtered off and washed with distilled water. Forty-one parts of 20.5 per cent of polymer is obtained which had comparatively high relative viscosity.

*Example 8*

In a vessel equipped for vacuum distillation and stirring, add 15 parts of KOH pellets while stirring to 1500 parts of pyrrolidone, seal the system and immediately distill off ca. 400 parts of pyrrolidone under vacuum as rapidly as possible (20 to 30 minutes). Pot temperatures should be less than 130° C., for best results; vapor temperatures will run 120 to 125° C. Pressure will vary from about 10 mm. of mercury during the surge of released water in the early stages to less than 1 mm. at the end of distillation. This amount of distillate is desirable since it insures removal of nearly all the water present. The reaction mixture is then cooled to about 40° C., and 3.75 parts of adipyl dipyrrolidone dissolved in 100 parts of anhydrous pyrrolidone is stirred in. A mildly exothermic reaction sets in a few minutes after addition of the activator and shortly afterwards the batch sets up to a tough, gel-like mass which will stop a laboratory stirrer.

After twenty-four hours standing, the tough gel is broken up and thoroughly agitated in a Waring blendor with about five volumes of water to remove the remaining caustic and any other water soluble materials. The polymer is filtered and rewashed with about the same amount of water, filtered again, sucked dry at the pump and then dried in a circulating air oven at 65 to 70° C.

The yield after drying to less than 1% moisture is 468 parts of granular polymer or 39% conversion based on the 1200 parts of pyrrolidone in the polymerizing mixture. This polymer has a relative viscosity of 4.0 for a 1% solution in meta-cresol.

*Example 9*

In a manner similar to that of the preceding example, pyrrolidone is polymerized using in place of the 3.75 parts adipyl dipyrrolidone, about 30 parts of maleic anhydride as activator. There is obtained a 61% theoretical yield of polymer having a relative viscosity of 2.4 for a 1% solution in metacresol.

*Example 10*

The procedure for Example 8 is repeated using 100 parts of butyl stearate as activator. After standing overnight, a very hard, resinous mass is obtained. This mass is dissolved by warming in anhydrous formic acid and then reprecipitated by diluting with 10 volumes of water. A 64% theoretical yield of product having a relative viscosity of a 1% solution in meta-cresol of 1.6 is obtained.

*Example 11*

100 parts of catalyzed pyrrolidone, as used in Example 7, is activated by the addition of 2 parts dimethyl malonate. A mildly exothermic reaction begins immediately. After standing for 48 hours, the reaction mixture sets and is worked up as described in Example 10. There are obtained 56 parts of polypyrrolidone.

*Example 12*

100 parts of catalyzed pyrrolidone, as used in Example 8, are activated by the addition of 2.2 parts benzoyl chloride. An exothermic reaction begins and, in less than one minute, a firm solid mass is obtained. After 48 hours, the mass is worked up in the manner of Example 10 with formic acid. Yield of 74% polypyrrolidone having a relative viscosity of a 1 per cent solution in meta-cresol of 6.7 is obtained.

As is apparent from the foregoing examples, the use of acyl compounds as activators in the polymerization of pyrrolidone and other five and six membered lactams according to the present invention, offers such advantages as increased yield of polymer and rate of polymerization.

In the polymerization of lactams as described above, wherein the lactam was treated with potassium hydroxide, potassium, etc., and with one of a series of acyl compounds of the general formula

$$R\overset{O}{\underset{\|}{C}}-x$$

a polyamide was formed in yields as high as 90 per cent. When yields of greater than approximately 30 per cent are obtained, the resulting mixture of lactam and polyamide is solid and the polyamide is difficult to isolate from the lactam matrix.

In accordance with this invention, a lactam is caused to polymerize while dispersed in a dry or anhydrous non-solvent and the polymer is recovered as a powder. Non-solvents include petroleum ether, gasoline, kerosene, pentane, hexane, octane, isooctane, cyclohexane, cyclohexene, octene, pentene, and other saturated and unsaturated hydrocarbons. The degree of subdivision of the resulting polymer may be regulated by varying the ratio of non-solvent to lactam and the speed of agitation of the suspension of lactam in non-solvent.

The following example will serve to illustrate the invention:

*Example 13*

Into a 500 ml. resin flask equipped with mechanical stirrer, thermometer, dropping funnel, heating mantle and condenser set down for distillation, was charged 124 grams of pyrrolidone. Under vacuum, 23 grams of distillate was collected. The vacuum was broken with dry nitrogen, and to the residue after cooling to 40° C., was added 300 cc. of dry petroleum ether. Petroleum ether was dried beforehand over sodium.

The mixture was agitated violently and 1.5 grams of clean potassium was added. After the potassium was completely dissolved in the pyrrolidone, 1 gram of activator, namely, adipyl dipyrrolidone, was dissolved in 5 cc. of dry pyrrolidone and added. Polymerization occurred immediately. The petroleum ether was filtered or distilled from the polymer and the polymer then agitated in a Waring blendor twice with water and then once with acetone. The final dry polymer (44 grams) was a white powder of very fine particle size.

The use of greater amounts of potassium and adipyl dipyrrolidone will result in higher yields of polymer.

The foregoing procedure of Example 13 may be employed in any of the examples described above using various activators and anhydrous non-solvents.

Various modifications of the invention as described above will be apparent to those skilled in the art. Hence, it will be understood that the invention is not limited to the foregoing description except as it is defined in the appended claims.

We claim:

1. In the polymerization of a lactam selected from the group consisting of pyrrolidone and piperidone in the presence of an alkaline polymerization catalyst and an acyl group containing activator therefor, the improvement comprising carrying out the polymerization of said lactam while dispersed in an anhydrous non-solvent therefor.

2. The process of claim 1 wherein said lactam is pyrrolidone.

3. The process of claim 1 wherein said lactam is piperidone.

4. The process of claim 1 wherein said anhydrous non-solvent is a hydrocarbon.

5. The process of claim 1 wherein from 1 to 100 parts by weight of said anhydrous non-solvent is present per 10 parts by weight of lactam.

6. The process of claim 1 wherein 30 parts by weight of said anhydrous non-solvent is present per 10 parts by weight of lactam.

References Cited in the file of this patent

FOREIGN PATENTS 263,292     Switzerland _____ Nov. 16, 1949